United States Patent
Huang et al.

(10) Patent No.: US 11,876,626 B2
(45) Date of Patent: Jan. 16, 2024

(54) ENHANCING REDUNDANCY VERSION COMMUNICATIONS

(71) Applicant: QUALCOMM Incorporated, San Diego, CA (US)

(72) Inventors: Yi Huang, San Diego, CA (US); Akshay Kumar, San Diego, CA (US); Arnaud Meylan, San Diego, CA (US); Seyedkianoush Hosseini, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 205 days.

(21) Appl. No.: 17/445,186

(22) Filed: Aug. 16, 2021

(65) Prior Publication Data

US 2023/0053130 A1 Feb. 16, 2023

(51) Int. Cl.
*H04L 1/18* (2023.01)
*H04L 1/1812* (2023.01)
*H04W 72/23* (2023.01)

(52) U.S. Cl.
CPC ........... *H04L 1/1819* (2013.01); *H04W 72/23* (2023.01)

(58) Field of Classification Search
CPC .............................. H04L 1/1819; H04W 72/23
See application file for complete search history.

(56) References Cited

U.S. PATENT DOCUMENTS

| | | | |
|---|---|---|---|
| 2020/0145141 A1* | 5/2020 | Park | H04L 1/1887 |
| 2021/0022165 A1* | 1/2021 | Sun | H04W 72/1268 |
| 2021/0037576 A1* | 2/2021 | Shao | H04L 1/189 |
| 2021/0167899 A1* | 6/2021 | Balasubramanian | H04L 1/1825 |
| 2021/0344452 A1* | 11/2021 | Liu | H04W 72/23 |
| 2022/0140949 A1* | 5/2022 | Kim | H04L 1/1861 370/329 |
| 2022/0174708 A1* | 6/2022 | Kim | H04L 1/1893 |
| 2022/0216947 A1* | 7/2022 | Kim | H04L 1/1819 |

* cited by examiner

*Primary Examiner* — Shukri Taha
(74) *Attorney, Agent, or Firm* — Harrity & Harrity, LLP

(57) ABSTRACT

Various aspects of the present disclosure generally relate to wireless communication. In some aspects, a mobile station may receive first downlink control information (DCI) indicating a first redundancy version (RV) index value associated with a hybrid automatic repeat request (HARQ) process. The mobile station may transmit, based at least in part on receiving the DCI indicating the first RV index value, data using a second RV index value, the second RV index value being different from the first RV index value. Numerous other aspects are described.

26 Claims, 10 Drawing Sheets

ENHANCING REDUNDANCY VERSION COMMUNICATIONS

FIELD OF THE DISCLOSURE

Aspects of the present disclosure generally relate to wireless communication and to techniques and apparatuses for enhancing redundancy version communications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a mobile station. The method may include receiving, by the mobile station, first downlink control information (DCI) indicating a first redundancy version (RV) index value associated with a hybrid automatic repeat request (HARQ) process. The method may include transmitting, by the mobile station and based at least in part on receiving the DCI indicating the first RV index value, data using a second RV index value, the second RV index value being different from the first RV index value.

Some aspects described herein relate to a method of wireless communication performed by a mobile station. The method may include receiving, by the mobile station, first DCI indicating a first RV index value associated with a HARQ process. The method may include transmitting, by the mobile station and based at least in part on receiving the DCI indicating the first RV index value, feedback indicating that the mobile station did not receive second DCI associated with a second RV index value.

Some aspects described herein relate to a method of wireless communication performed by a base station. The method may include transmitting, by the base station, first DCI indicating a first RV index value associated with a HARQ process. The method may include receiving, by the base station, data associated with the HARQ process, the data being associated with a second RV index value different from the first RV index value.

Some aspects described herein relate to a mobile station for wireless communication. The mobile station may include a memory and one or more processors coupled to the memory. The one or more processors may be configured to receive first DCI indicating a first RV index value associated with a HARQ process. The one or more processors may be configured to transmit, based at least in part on receiving the DCI indicating the first RV index value, data using a second RV index value.

Some aspects described herein relate to a mobile station for wireless communication. The mobile station may include a memory and one or more processors coupled to the memory. The one or more processors may be configured to receive first DCI indicating a first RV index value associated with a HARQ process. The one or more processors may be configured to transmit, based at least in part on receiving the DCI indicating the first RV index value, feedback indicating that the mobile station did not receive second DCI associated with a second RV index value.

Some aspects described herein relate to a base station for wireless communication. The base station may include a memory and one or more processors coupled to the memory. The one or more processors may be configured to transmit first DCI indicating a first RV index value associated with a HARQ process. The one or more processors may be configured to receive data associated with the HARQ process.

Some aspects described herein relate to a non-transitory computer-readable medium that stores a set of instructions for wireless communication by a mobile station. The set of instructions, when executed by one or more processors of the mobile station, may cause the mobile station to receive first DCI indicating a first RV index value associated with a HARQ process. The set of instructions, when executed by one or more processors of the mobile station, may cause the mobile station to transmit, based at least in part on receiving the DCI indicating the first RV index value, data using a second RV index value.

Some aspects described herein relate to a non-transitory computer-readable medium that stores a set of instructions for wireless communication by a mobile station. The set of instructions, when executed by one or more processors of the mobile station, may cause the mobile station to receive first DCI indicating a first RV index value associated with a HARQ process. The set of instructions, when executed by one or more processors of the mobile station, may cause the mobile station to transmit, based at least in part on receiving the DCI indicating the first RV index value, feedback indicating that the mobile station did not receive second DCI associated with a second RV index value.

Some aspects described herein relate to a non-transitory computer-readable medium that stores a set of instructions for wireless communication by a base station. The set of instructions, when executed by one or more processors of the base station, may cause the base station to transmit first DCI indicating a first RV index value associated with a HARQ process. The set of instructions, when executed by one or more processors of the base station, may cause the base station to receive data associated with the HARQ process.

Some aspects described herein relate to an apparatus for wireless communication. The apparatus may include means for receiving first DCI indicating a first RV index value associated with a HARQ process. The apparatus may include means for transmitting, based at least in part on receiving the DCI indicating the first RV index value, data using a second RV index value, the second RV index value being different from the first RV index value.

Some aspects described herein relate to an apparatus for wireless communication. The apparatus may include means for receiving first DCI indicating a first RV index value associated with a HARQ process. The apparatus may include means for transmitting, based at least in part on receiving the DCI indicating the first RV index value, feedback indicating that the mobile station did not receive second DCI associated with a second RV index value.

Some aspects described herein relate to an apparatus for wireless communication. The apparatus may include means for transmitting first DCI indicating a first RV index value associated with a HARQ process. The apparatus may include means for receiving data associated with the HARQ process, the data being associated with a second RV index value different from the first RV index value.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
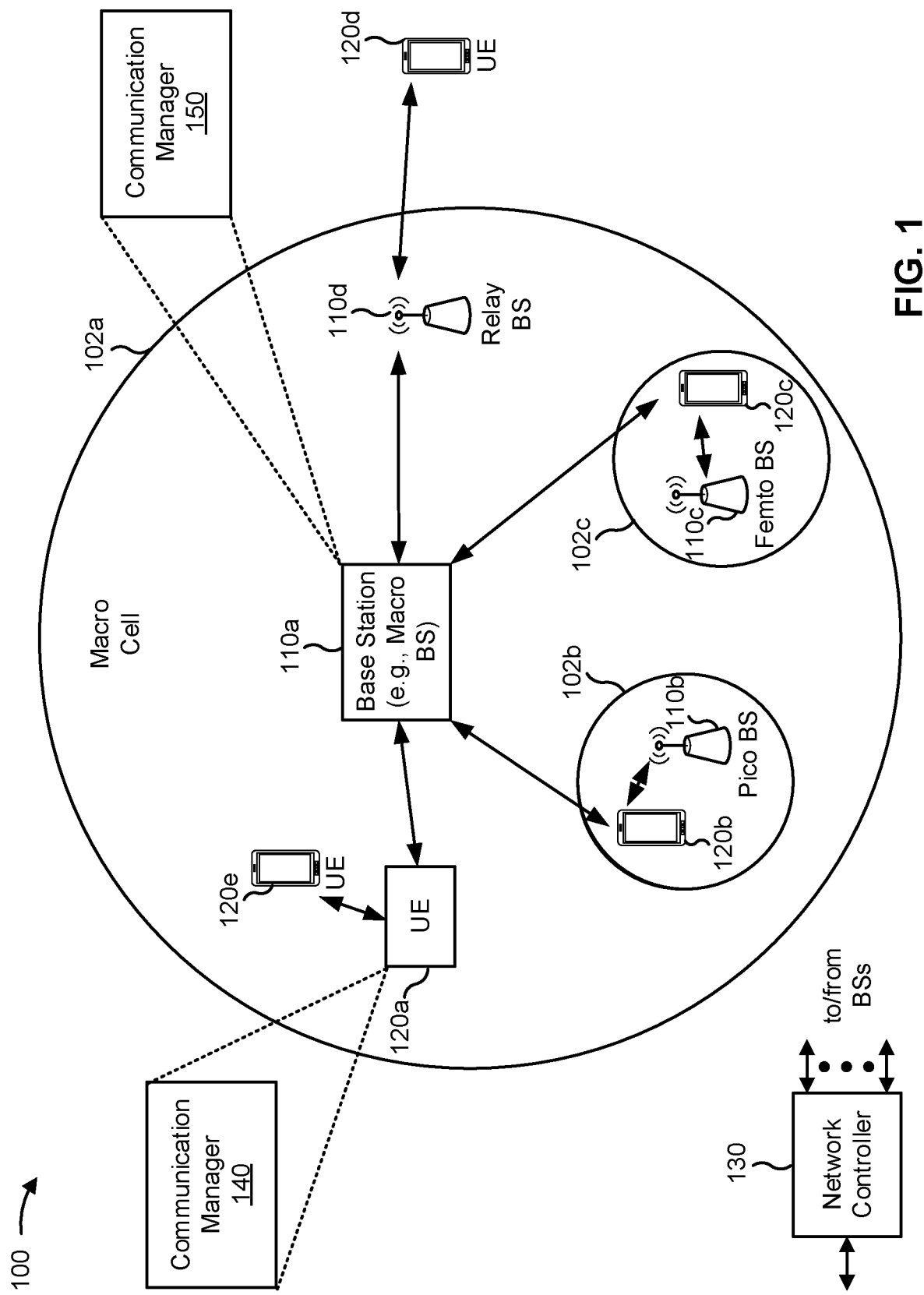
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the mobile station (e.g., UE 120) may include a communication manager 140. As described in more detail elsewhere herein, the communication manager 140 may receive first downlink control information (DCI) indicating a first redundancy version (RV) index value associated with a hybrid automatic repeat request (HARQ) process; and transmit, based at least in part on receiving the DCI indicating the first RV index value, data using a second RV index value, the second RV index value being different from the first RV index value. In some aspects, the communication manager 140 may receive first DCI indicating a first RV index value associated with a HARQ process; and transmit, based at least in part on receiving the DCI indicating the first RV index value, feedback indicating that the mobile station did not receive second DCI associated with a second RV index value. Additionally, or alternatively, the communication manager 140 may perform one or more other operations described herein.

In some aspects, the base station 110 may include a communication manager 150. As described in more detail elsewhere herein, the communication manager 150 may transmit first DCI indicating a first RV index value associated with a HARQ process; and receive data associated with the HARQ process, the data being associated with a second RV index value different from the first RV index value. Additionally, or alternatively, the communication manager 150 may perform one or more other operations described herein.

As indicated above, FIG. 1 is provided as an example. Other examples may differ from what is described with regard to FIG. 1.

Figure 2:
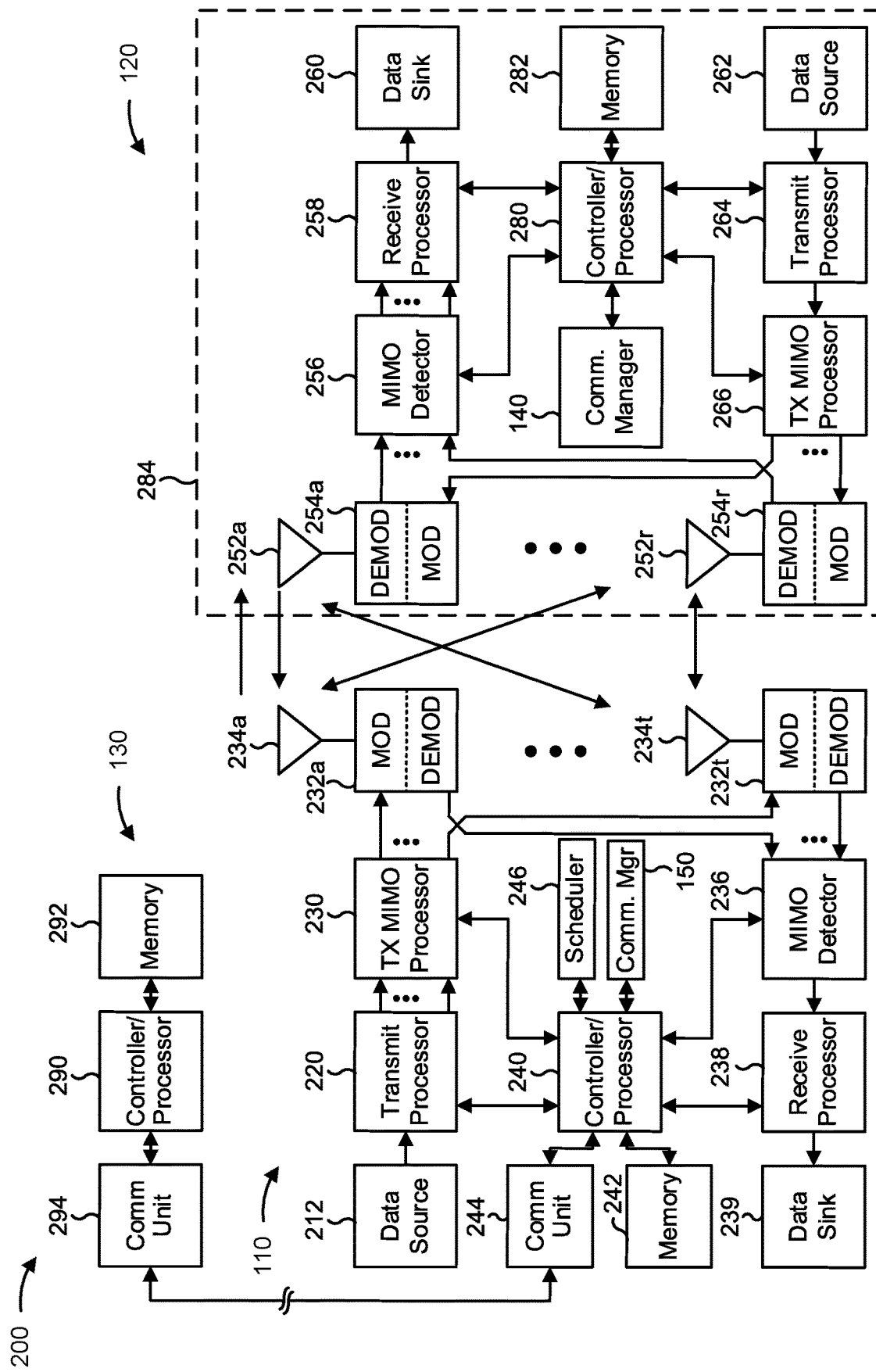
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-9).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-9).

The controller/processor 240 of the base station 110, the controller/processor 280 of the UE 120, and/or any other component(s) of FIG. 2 may perform one or more techniques associated with enhancing redundancy version communications, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, the mobile station (e.g., UE 120) includes means for receiving, by the mobile station, first DCI indicating a first RV index value associated with a HARQ process; and/or means for transmitting, by the mobile station and based at least in part on receiving the DCI indicating the first RV index value, data using a second RV index value, the second RV index value being different from the first RV index value. The means for the mobile station to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the mobile station includes means for receiving, by the mobile station, first DCI indicating a first RV index value associated with a HARQ process; and/or means for transmitting, by the mobile station and based at least in part on receiving the DCI indicating the first RV index value, feedback indicating that the mobile station did not receive second DCI associated with a second RV index value. In some aspects, the means for the mobile station to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station includes means for transmitting, by the base station, first DCI indicating a first RV index value associated with a HARQ process; and/or means for receiving, by the base station, data associated with the HARQ process, the data being associated with a second RV index value different from the first RV index value. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
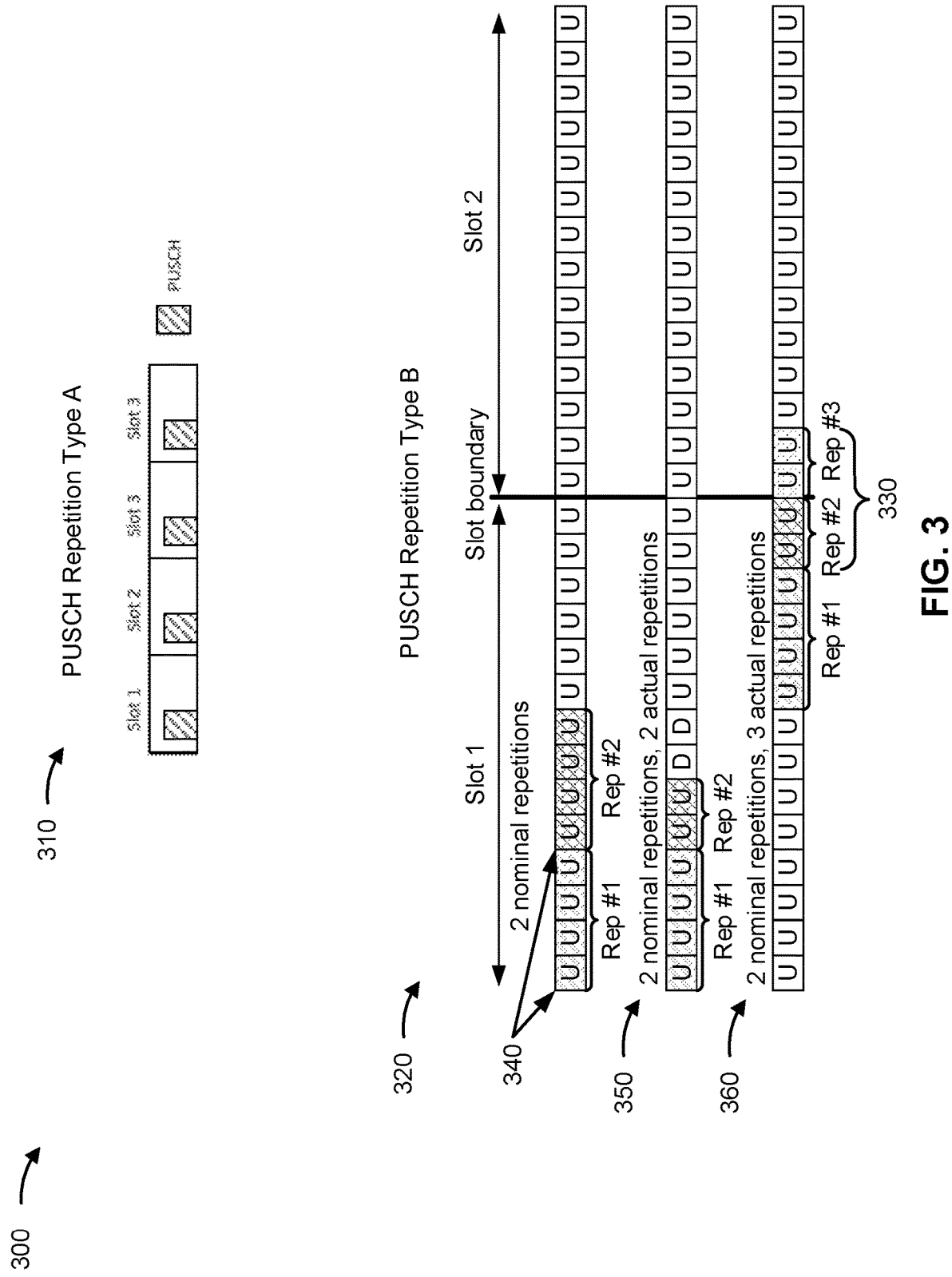
FIG. 3 is a diagram illustrating an example of physical uplink shared channel (PUSCH) Repetition Type A and PUSCH Repetition Type B, in accordance with the present disclosure.

FIG. 3 is a diagram illustrating an example 300 of physical uplink shared channel (PUSCH) Repetition Type A and PUSCH Repetition Type B, in accordance with the present disclosure. Although techniques are described herein in connection with PUSCH repetitions, these techniques can be applied to various types of uplink repetitions, such as an uplink data repetition, an uplink control repetition (e.g., a physical uplink control channel (PUCCH) repetition), or the like.

A repetition, such as an uplink repetition or a downlink repetition, may be used to improve reliability, such as for ultra reliable low latency communication (URLLC) or for UEs 120 located in a geographic area with poor channel conditions (e.g., a cell edge). When repetitions are used, a transmitter repeats transmission of a communication multiple times. For example, a UE 120 may transmit an initial uplink communication and may repeat transmission of (e.g., may retransmit) that uplink communication one or more times. When a UE 120 is configured with repetitions, the UE 120 may retransmit an initial transmission without first receiving feedback (e.g., an acknowledgement (ACK) or negative acknowledgement (NACK)) indicating whether the initial transmission was successfully received. In some aspects, ACK or NACK feedback may be disabled for repetitions, thereby reducing signaling overhead that would otherwise be used for ACK or NACK feedback.

In some aspects, a repeated transmission (sometimes referred to as a retransmission) may include the exact same encoded bits (e.g., information bits and parity bits) as the initial transmission and/or as another repeated transmission (e.g., where a same redundancy version is used across repetitions). Alternatively, a repeated transmission may include different encoded bits (e.g., a different combination of information bits and/or parity bits) than the initial transmission and/or another repeated transmission (e.g., where different redundancy versions are used across repetitions).

As used herein, the term "repetition" is used to refer to the initial communication and is also used to refer to a repeated transmission of the initial communication. For example, if the UE 120 is configured to transmit four repetitions, then the UE 120 may transmit an initial transmission and may transmit three repeated transmissions of that initial transmission. Thus, each transmission (regardless of whether the transmission is an initial transmission or a retransmission) is counted as a repetition. A repetition may be transmitted in a transmission occasion, which is sometimes referred to as a transmission instance.

As shown by reference number 310, for a first uplink repetition type referred to as PUSCH Repetition Type A, uplink transmission occasions are not permitted to cross a slot boundary, and only one uplink transmission occasion is permitted per slot. Thus, if a UE 120 is configured with PUSCH Repetition Type A, then the UE 120 cannot transmit a repetition in a set of symbols that occurs in more than one slot, and can only transmit the repetition if all symbols of the repetition occur in the same slot. Furthermore, if a UE 120 is configured with PUSCH Repetition Type A, then the UE 120 cannot transmit more than one repetition per slot. Thus, for PUSCH Repetition Type A, a transmission occasion corresponds to a slot. Furthermore, for PUSCH Repetition Type A, the time domain allocation for a repetition within a slot may be the same across all slots for which repetitions are scheduled. In other words, each repetition, associated with the same initial transmission, may start in the same starting symbol (e.g., having the same starting symbol index) in each slot in which a repetition is scheduled and may occupy the same number of symbols.

As shown by reference number 320, for a second uplink repetition type referred to as PUSCH Repetition Type B, uplink transmission occasions are permitted to cross a slot boundary (as shown by reference number 330, where a single nominal repetition crosses a slot boundary and is divided into two actual repetitions), and more than one uplink transmission occasion is permitted per slot (as shown by reference number 340). Thus, if a UE 120 is configured with PUSCH Repetition Type B, then the UE 120 can transmit a repetition (e.g., a nominal repetition) in a set of symbols that occurs in more than one slot, and the UE 120 can transmit the repetition even if all symbols of the repetition do not occur in the same slot. Furthermore, if a UE 120 is configured with PUSCH Repetition Type B, then the UE 120 can transmit more than one repetition per slot. Thus, for PUSCH Repetition Type B, a transmission occasion corresponds to a portion of a slot, such as a mini-slot. Furthermore, for PUSCH Repetition Type B, the time domain allocation for a repetition within a slot may be different for different repetitions. In other words, different repetitions, associated with the same initial transmission, may start in different starting symbols (e.g., having different starting symbol indexes).

In PUSCH Repetition Type B, the term "nominal repetition" refers to a potential PUSCH repetition as indicated by the base station 110. A nominal repetition signaled or scheduled by the base station 110 may be truncated or divided into one or two "actual repetitions." A nominal repetition consists of a set of consecutive symbols over which the UE 120 is expected to transmit a PUSCH repetition. However, when this set of consecutive symbols crosses a slot boundary, contains semi-static downlink symbols, or encounters (e.g., is scheduled to occur within) an invalid symbol pattern, among other examples, then the UE 120 is required to split the nominal repetition into one or two parts. Each of these parts is then referred to as an "actual repetition."

For example, as shown by reference number 350, a PUSCH transmission may include four symbols, and a base station 110 may configure a UE 120 (e.g., in a radio resource control (RRC) message) to transmit two nominal repetitions of the PUSCH transmission. The two nominal repetitions may span a total of eight symbols and may each include four symbols. The two nominal repetitions are scheduled in the first eight symbols of a slot (shown as Slot 1). For example, the first nominal repetition may be scheduled in the first four symbols of a slot (the first, second, third, and fourth symbols), and the second nominal repetition may be scheduled in the next four symbols of the slot (the fifth, sixth, seventh, and eighth symbols). The first nominal repetition is actually transmitted in the first four symbols and is thus treated as a single actual repetition (shown as "Rep #1"). For the second nominal repetition, the UE 120 actually transmits the first two symbols but cannot transmit the last two symbols because the last two symbols are downlink symbols. Thus, the UE 120 drops the last two symbols, and the resulting actual repetition (shown as "Rep #2") includes only the first two symbols.

As another example, as shown by reference number 360, a PUSCH transmission may include four symbols, and a base station 110 may configure a UE 120 to transmit two nominal repetitions of the PUSCH transmission. The two nominal repetitions may each include four symbols, shown as the ninth, tenth, eleventh, and twelfth symbols of a first slot (Slot 1) for a first nominal repetition, and shown as the thirteenth and fourteenth symbols of the first slot plus the first and second symbols of a second slot (Slot 2) for a second nominal repetition. The first nominal repetition is transmitted in four consecutive symbols and is thus treated as a single actual repetition (shown as "Rep #1"). The second nominal repetition is transmitted in consecutive symbols that cross a slot boundary (e.g., that occur in more than one slot) and is thus divided into two actual repetitions, with a first actual repetition (shown as "Rep #2") being transmitted in a first set of consecutive symbols in the first slot (the thirteenth and fourteenth symbols of Slot 1) and a second actual repetition (shown as "Rep #3") being transmitted in a second set of consecutive symbols in the second slot (the first and second symbols of Slot 2).

A PUSCH transmission, or retransmission, that carries uplink data may be dynamically scheduled by a downlink communication, such as a DCI message carried on a physical downlink control channel (PDCCH). For example, in some aspects, a DCI message that dynamically schedules a PUSCH transmission may indicate various scheduling parameters for the scheduled PUSCH transmission, such as a resource allocation (e.g., a frequency domain resource allocation (FDRA), a time domain resource allocation (TDRA), and/or the like), an MCS, a HARQ process number (HPN), a new data indicator (NDI), an RV, and/or the like.

"HARQ" refers to a protocol in which a receiver checks for errors in received data and, if an error is detected, the receiver buffers the received data (e.g., in a decoding buffer) and requests a retransmission from a transmitter. The receiver may then be able to combine the buffered data with the retransmitted data prior to performing processing of the data (e.g., performing channeling decoding and/or error detection). The performing of HARQ feedback may facilitate improving the reliability of a data transmission by managing the transmission (and re-transmission) of data from the transmitter to the receiver.

The DCI may indicate an NDI and an RV for each PUSCH transmission that is scheduled by the DCI message. For example, an NDI field may be toggled for a given HARQ process number if the corresponding PUSCH transmission is a new transmission, or not toggled for the given HARQ process number if the corresponding PUSCH transmission is a retransmission, and the RV field may indicate redundancy added to the corresponding PUSCH transmission depending on whether the corresponding PUSCH transmission is a new transmission, a first retransmission, a second retransmission, or a third retransmission, as described further herein. An NDI field in the DCI message may use one or more bits per PUSCH transmission to indicate the NDI value for each respective PUSCH transmission, and the RV field in the DCI message may use two bits to indicate an RV value of 0, 1, 2, or 3 if the DCI message schedules one PUSCH transmission.

As indicated above, FIG. 3 is provided as an example. Other examples may differ from what is described with respect to FIG. 3.

Figure 4:
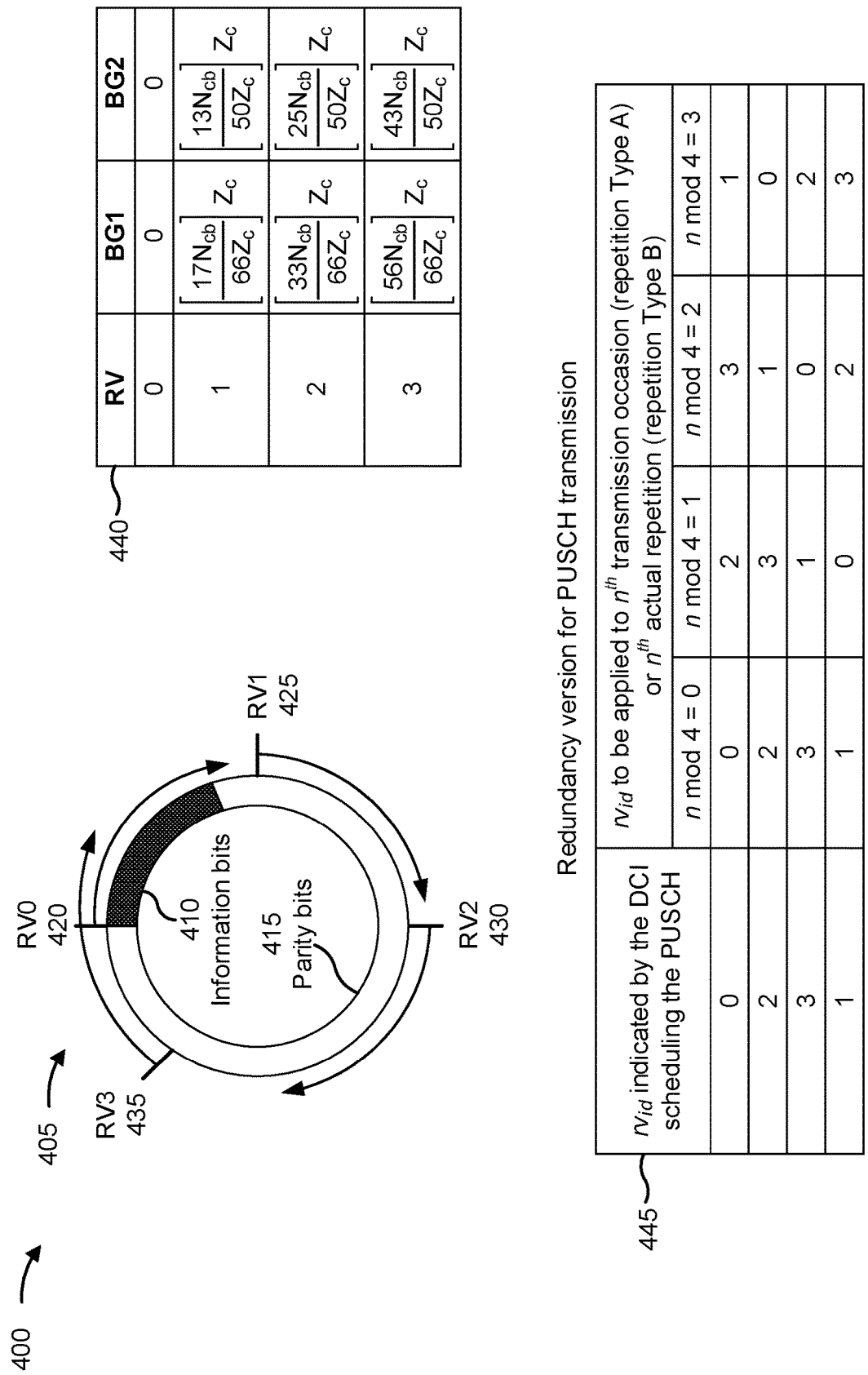
FIG. 4 is a diagram illustrating an example of RV cycling based on uplink transmission occasions, in accordance with the present disclosure.

FIG. 4 is a diagram illustrating an example 400 of RV cycling based on uplink transmission occasions, in accordance with the present disclosure. A UE 120 may apply redundancy version cycling to PUSCH repetitions to transmit different redundancy versions of the PUSCH repetition in different transmission occasions.

"Redundancy version" (RV) of a PUSCH repetition refers to a set of encoded bits that are transmitted for that PUSCH repetition. Using RV cycling, the UE 120 transmits a different set of encoded bits in different PUSCH repetitions. For example, the UE 120 may store bits for an uplink transmission in a circular buffer 405 (e.g., stored in memory of the UE 120). The circular buffer 405 stores information bits 410 and parity bits 415 (sometimes called parity-check bits). The information bits 410 may include the data to be transmitted, and the parity bits 415 may include linear combinations of the data (e.g., of the information bits 410). The UE 120 may encode information bits 410, parity bits 415, or a combination of information bits 410 and parity bits 415 into a set of encoded bits, and may transmit the set of encoded bits. The particular bits that are selected to be included in the set of encoded bits for a PUSCH repetition depend on (or are defined by) the RV of that PUSCH repetition.

As an example, the starting bit locations may be defined by a table 440, such as for NR HARQ using low-density parity-check (LDPC) code. The table 440 defines starting bit locations in the circular buffer 405 for a first base graph (BG1) and a second base graph (BG2). A base graph is a parameter for determining parity bits 415 for a transmission based at least in part on a transport block (TB) size and a code rate (with BG1 being intended for TBs with a larger TB size, and BG2 being intended for TBs with a smaller TB size). Referring to the table, Ncb represents the length of the circular buffer 405 (e.g., the number of bits included in the circular buffer 405), and Zc represents a lifting size, which is based at least in part on the number of information bits 410 and the number of BG columns corresponding to information bits 410.

In some examples, a base station 110 may transmit information, such as an RV index, to the UE 120. For example, the base station 110 may transmit the RV index for a PUSCH communication (e.g., a PUSCH transmission) in DCI that schedules the PUSCH communication. The RV index may indicate a sequence of RVs to be applied to a corresponding sequence of PUSCH transmission occasions (e.g., PUSCH opportunities). The UE 120 may increment a counter n (sometimes called an index n) for each uplink transmission occasion following (or indicated by) the DCI. The UE 120 may use the information transmitted by the base station 110 (e.g., the RV index) and the value of the counter n for a particular transmission occasion to determine an RV to be applied to that transmission occasion.

For example, as shown by table 445, for PUSCH Repetition Type A, if the base station 110 indicates an RV index of 0, then the UE 120 may determine an RV to be applied to an nth transmission occasion (e.g., for PUSCH Repetition Type A) by calculating n mod 4, where mod represents a modulo operation. If n mod 4=0 (e.g., for transmission occasion 0), then the UE 120 applies RV0 to that transmission occasion. If n mod 4=1 (e.g., for transmission occasion 1), then the UE 120 applies RV2 to that transmission occasion. If n mod 4=2 (e.g., for transmission occasion 2), then the UE 120 applies RV3 to that transmission occasion. If n mod 4=3 (e.g., for transmission occasion 3), then the UE 120 applies RV1 to that transmission occasion. As shown, the RV index may have a value of 0, 1, 2, or 3, each of which corresponds to a different sequence of RVs (e.g., a different order for RV0, RV1, RV2, and RV3).

Similarly, for PUSCH Repetition Type B, if the base station 110 indicates an RV index of 0, then the UE 120 may determine an RV to be applied to an nth actual repetition (e.g., of PUSCH Repetition Type B) by calculating n mod 4, where mod represents a modulo operation. If n mod 4=0 (e.g., for actual repetition 0), then the UE 120 applies RV0 to that actual repetition. If n mod 4=1 (e.g., for actual repetition 1), then the UE 120 applies RV2 to that actual repetition. If n mod 4=2 (e.g., for actual repetition 2), then the UE 120 applies RV3 to that actual repetitions. If n mod 4=3 (e.g., for actual repetition 3), then the UE 120 applies RV1 to that actual repetition.

As indicated above, FIG. 4 is provided as an example. Other examples may differ from what is described with respect to FIG. 4. For example, the RV cycling technique shown in table 445 is one example of an RV cycling technique, and other RV cycling techniques maybe used.

As noted herein, RV cycling may facilitate improving the reliability of a data transmission and improving the likelihood of successful decoding by a recipient. However, in some situations, a UE may miss an initial DCI requesting RV0 and instead receive DCI, from a base station, requesting RV1, RV2, or RV3. While the UE may comply with the request (e.g., transmitting, to the base station, a PUSCH using the requested RV in response to the DCI), transmitting a PUSCH using RV1, RV2, or RV3 may provide the base station with fewer information bits, and/or more parity bits, than a PUSCH transmission using RV0 would provide. In this situation, the UE may need to provide additional PUSCH repetitions to ensure the base station receives and is able to decode the transmitted information.

Some techniques and apparatuses described herein enable a UE to automatically respond to DCI requesting a PUSCH repetition using RV0 when the DCI indicates a different RV index (e.g., RV1, RV2, or RV3), and further enable a base station to process a PUSCH repetition that was transmitted using an RV index other than the RV that was requested by the DCI. For example, a base station may transmit, and a UE may receive, a DCI indicating a first RV index value (e.g., RV1, RV2, or RV3) associated with a HARQ process. Based at least in part on receiving the DCI indicating the first RV index value, the UE may transmit, and the base station may receive, data using a second RV index value (e.g., RV0). In some aspects, the UE may determine to transmit the data using the second RV index value, rather than the first RV index value, based at least in part on the UE having not yet transmitted the PUSCH using the second RV index value. As a result, the base station is provided with data that may include more information bits, and fewer parity bits, than the data that would have been provided using the RV index initially indicated by the DCI. Providing the base station with data including more information bits and fewer parity bits, relative to other RVs, facilitates decoding the transmitted data, which may result in faster and/or more accurate decoding, and may also result in less repetitions being needed to transmit the data. Thus, efficiency and accuracy of network communications may be improved.

Figure 5:
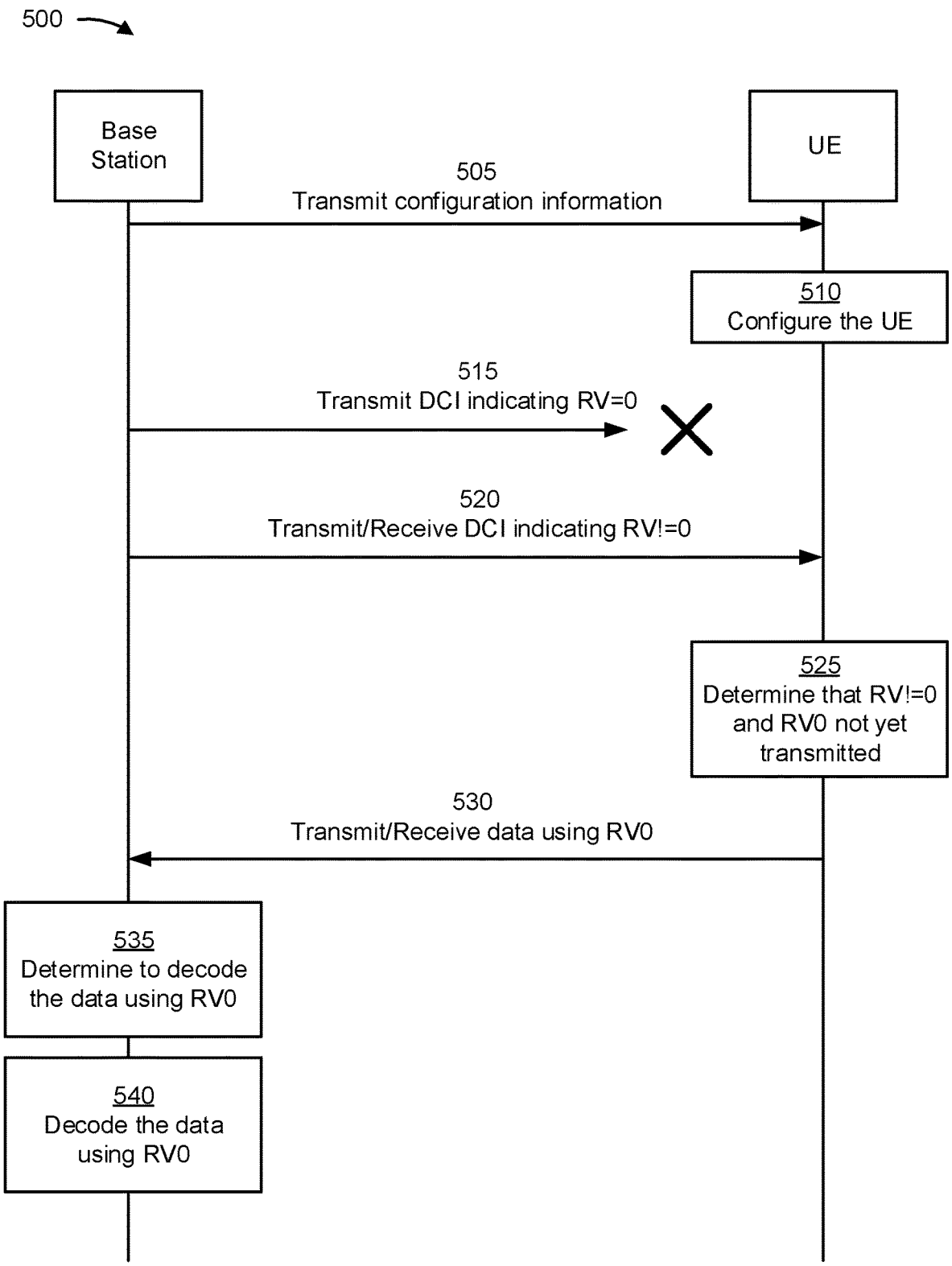
FIG. 5 is a diagram illustrating an example associated with enhancing redundancy version communications, in accordance with the present disclosure.

FIG. 5 is a diagram illustrating an example 500 associated with enhancing redundancy version communications, in accordance with the present disclosure. As shown in FIG. 5, a UE (e.g., UE 120) may communicate (e.g., transmit an uplink transmission and/or receive a downlink transmission) with a base station (e.g., base station 110). The UE and the base station may be part of a wireless network (e.g., wireless network 100).

As shown by reference number 505, the base station may transmit, and the UE may receive, configuration information. In some aspects, the UE may receive configuration information from another device (e.g., from another base station or another UE). In some aspects, the UE may receive the configuration information via RRC signaling and/or medium access control (MAC) signaling (e.g., MAC control elements (MAC CEs)). In some aspects, the configuration information may include an indication of one or more configuration parameters (e.g., already known to the UE) for selection by the UE and/or explicit configuration information for the UE to use to configure the UE.

In some aspects, the configuration information may indicate that the UE is to transmit data using RV0 in response to DCI indicating an RV index other than RV=0 when the UE has not yet transmitted data using RV0 (e.g., for a HARQ process). For example, the UE may be configured to receive DCI indicating a first RV index value associated with a HARQ process. Based at least in part on determining that the RV index is not 0, and/or that the UE has not yet transmitted data using RV0 for the HARQ process, the UE may transmit a response to the DCI (e.g., a PUSCH) using RV0 to encode the information being transmitted. In some aspects, the configuration information may indicate that the base station may receive the data from the UE and decode it using RV0, despite having received the data in response to a request for data encoded using a different RV index value.

As shown by reference number 510, the UE may configure the UE for communicating with the base station. In some aspects, the UE may configure the UE based at least in part on the configuration information. In some aspects, the UE may be configured to perform one or more operations described herein.

As shown by reference number 515, the base station may transmit, to the UE, DCI (e.g., via PDCCH) indicating an RV index of 0. As described herein, the DCI may be transmitted as part of a HARQ process and may indicate additional information, in addition to the RV index (e.g., a HARQ process number or identity, and/or a new data indicator, among other examples). The DCI indicates that the base station is requesting a transmission (e.g., a HARQ transmission, retransmission, or repetition, among other examples) from the UE, and that the base station expects the UE to apply the RV index of 0 (e.g., RV0) when encoding the data for transmission (e.g., via PUSCH). In the example 500 shown, the transmission of the DCI indicating the RV index of 0 is not successfully received by the UE.

As shown by reference number 520, the base station may transmit, and the UE may receive, DCI indicating a first RV index value (e.g., a value other than 0, such as RV=1, 2, or 3) associated with a HARQ process (e.g., identified by the DCI via a HARQ process number). In this example, the HARQ process may be the same HARQ process for which the UE missed the first DCI (e.g., described with respect to reference number 515).

As shown by reference number 525, the UE may determine that a response to the DCI received by the UE should be transmitted using RV0 to encode the data. In some aspects, the UE may determine that the first RV index value (e.g., RV index value other than 0, e.g., RV=1, 2, or 3), does not match a second RV index value (e.g., RV index value of 0, e.g., RV=0). Based at least in part on determining that the first RV index value does not match the second RV index value, the UE may determine to transmit data to the base station using the second RV index value (e.g., using RV0 to encode the data). In some aspects, the UE may determine that the UE has not yet transmitted, using the second RV index value, data associated with the HARQ process. For example, the UE may determine that, for the HARQ process number identified in the DCI received by the UE, the UE has not yet transmitted data to the base station using RV0. Based at least in part on determining that the UE has not yet transmitted the data to the base station using RV0, the UE may determine to transmit data to the base station using the second RV index value. In some aspects, a combination of the foregoing determinations may be used to determine whether the UE is to transmit data to the base station using RV0 or another RV index value.

As shown by reference number 530, the UE may transmit, and the base station may receive, data using the second RV index value (e.g., data transmitted via PUSCH and encoded using RV0). The second RV index value may be different from the first RV index value. For example, the UE may transmit the data using the second RV index value based at least in part on receiving the DCI indicating the first RV index value. In some aspects, as described herein, the UE may determine to transmit the data using the second RV index value based at least in part on the first RV index value not matching the second RV index value and/or the UE having not yet transmitted the data associated with the HARQ process using the second RV index value.

In some aspects, the UE may transmit, and the base station may receive, feedback indicating that the UE did not receive the second DCI associated with the second RV index value and/or feedback indicating that the data is to be decoded using the second RV index value. For example, the UE may transmit feedback to the base station (e.g., via the same transmission using the second RV index value or using a separate transmission via PUCCH or PUSCH), and the feedback may indicate that the UE did not receive DCI indicating RV=0.

In some aspects, the feedback may include a 16-bit bitmask that identifies the HARQ process by a bit position of the 16-bit bitmask. For example, each bit of the 16-bit bitmask may be associated with a corresponding HARQ process, and one or more bit values of the 16-bit bitmask may be used to indicate, for which HARQ processes, DCI indicating RV=0 was not received before a different RV index value.

In some aspects, the feedback may include a 4-bit index that identifies the HARQ process by an identifier (e.g., a HARQ process number). For example, the 4-bit index may be used to indicate a value between 0 and 15, which may correspond to one of 16 different HARQ processes for which DCI indicating RV=0 was not received before a different RV index value.

In some aspects, the feedback may include a single feedback bit. For example, the feedback bit may be used to indicate, to the base station, that data being transmitted to the base station for a HARQ process (but not necessarily indicating which HARQ process) is being transmitted with RV0, instead of the RV indicated by the DCI. In some aspects, the feedback may include two stage feedback. In this example, a single feedback bit may indicate whether a second stage of feedback (e.g., 16-bit bitmask, 4-bit index, or another type of feedback) is included in the feedback. For example, a single feedback bit of 0 may indicate that no second stage feedback is included and/or needed, and a single feedback bit of 1 may indicate that the second stage of feedback follows the single feedback bit. In some aspects, the base station may use the two stage feedback to determine whether a HARQ process is identified by the feedback and to identify the HARQ process. In some aspects, the base station may use context associated with the feedback (e.g., timing data or other information included in a PUSCH or PUCCH used to transmit the feedback) to determine which HARQ process the feedback is associated with (e.g., to enable the base station to decode the data using RV0). In some aspects, the base station may not identify the HARQ process and perform an extra decoding step, using RV0, for data received by the base station but unable to be decoded by another RV value.

As shown by reference number 535, the base station may determine that the data is to be decoded using RV0 (e.g., despite being received in response to DCI indicating a different RV index value). In some aspects, the base station may attempt to decode the data using an RV index value other than RV0 (e.g., the first RV index value transmitted in the DCI received by the UE) and fail. Based at least in part on failing to decode the data with the RV index value other than RV0, the base station may determine to decode the data using RV0. In some aspects, the base station may determine that the data is to be decoded using the second RV index value based at least in part on receiving feedback from the UE, as described herein. For example, in a situation where the UE provided feedback to the base station, the base station may forgo attempting to decode the data using a different RV index value and determine that the feedback indicates that the data should be decoded using RV0.

As shown by reference number 540, the base station may decode the data using the second RV index value (e.g., RV0). By decoding the data using the second RV index value, rather than the first RV index value, the base station may be able to successfully decode the data transmitted by the UE. In this situation, as described herein, receiving the data encoded using RV0 may be more beneficial than receiving other data encoded using a different RV index value. For example, the data transmitted using RV0 may include more information bits than parity bits, which may facilitate decoding the data faster and/or more accurately than data transmitted using a different RV index value.

As indicated above, FIG. 5 is provided as an example. Other examples may differ from what is described with regard to FIG. 5.

Figure 6:
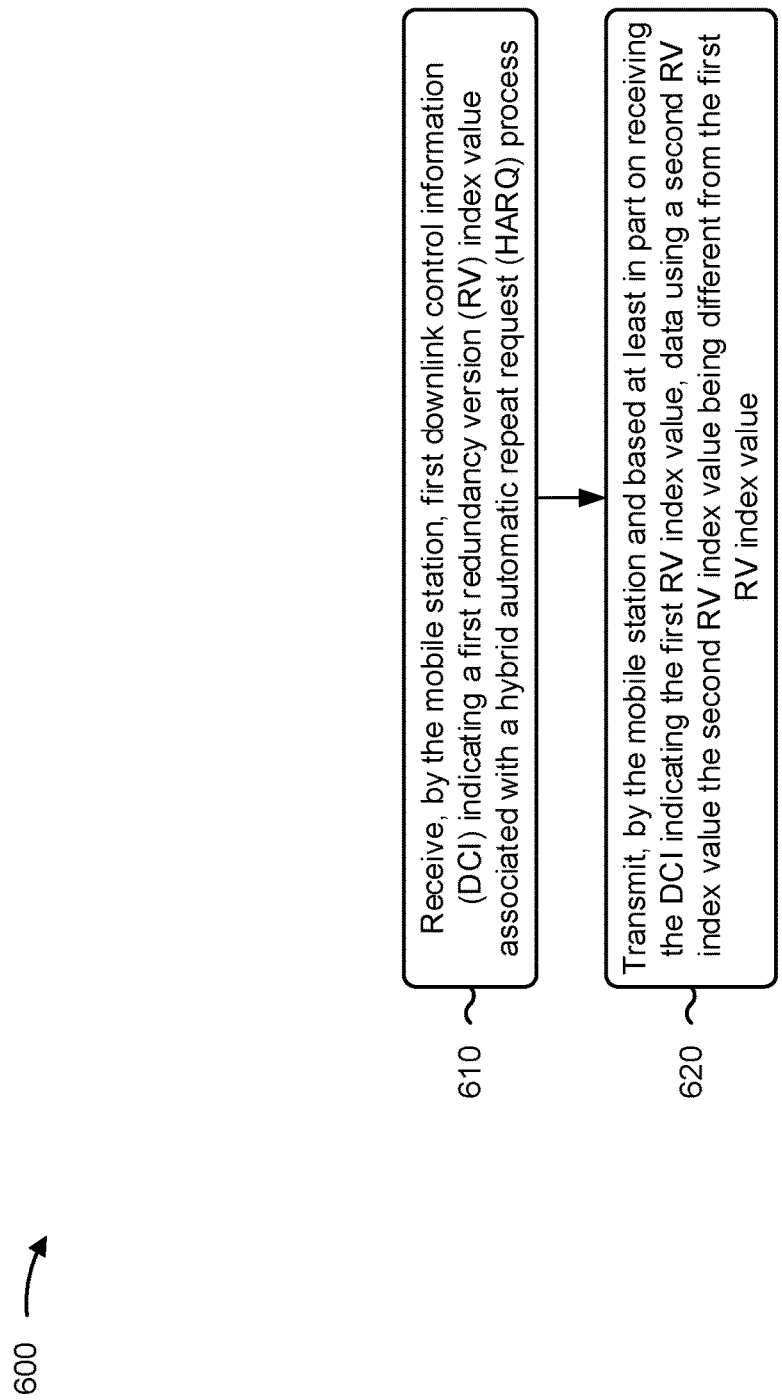
FIGS. 6-8 are diagrams illustrating example processes associated with enhancing redundancy version communications, in accordance with the present disclosure.

FIG. 6 is a diagram illustrating an example process 600 performed, for example, by a mobile station, in accordance with the present disclosure. Example process 600 is an example where the mobile station (e.g., UE 120) performs operations associated with enhancing redundancy version communications.

As shown in FIG. 6, in some aspects, process 600 may include receiving first DCI indicating a first RV index value associated with a HARQ process (block 610). For example, the mobile station (e.g., using communication manager 140 and/or reception component 902, depicted in FIG. 9) may receive first DCI indicating a first RV index value associated with a HARQ process, as described above.

As further shown in FIG. 6, in some aspects, process 600 may include transmitting, based at least in part on receiving the DCI indicating the first RV index value, data using a second RV index value, the second RV index value being different from the first RV index value (block 620). For example, the mobile station (e.g., using communication manager 140 and/or transmission component 904, depicted in FIG. 9) may transmit, based at least in part on receiving the DCI indicating the first RV index value, data using a second RV index value, the second RV index value being different from the first RV index value, as described above.

Process 600 may include additional aspects, such as any single aspect or any combination of aspects described below and/or in connection with one or more other processes described elsewhere herein.

In a first aspect, process 600 includes determining that the first RV index value does not match the second RV index value, and transmitting the data using the second RV index value comprises transmitting the data using the second RV index value based at least in part on determining that the first RV index value does not match the second RV index value.

In a second aspect, alone or in combination with the first aspect, process 600 includes determining that the mobile station has not yet transmitted, using the second RV index value, data associated with the HARQ process, and transmitting the data using the second RV index value comprises transmitting the data using the second RV index value based at least in part on determining that the mobile station has not yet transmitted, using the second RV index value, the data associated with the HARQ process.

In a third aspect, alone or in combination with one or more of the first and second aspects, process 600 includes transmitting feedback indicating that the mobile station did not receive second DCI associated with the second RV index value.

In a fourth aspect, alone or in combination with one or more of the first through third aspects, the feedback comprises a 16-bit bitmask that identifies the HARQ process by a bit position of the 16-bit bitmask.

In a fifth aspect, alone or in combination with one or more of the first through fourth aspects, the feedback comprises a 4-bit index that identifies the HARQ process by an identifier.

In a sixth aspect, alone or in combination with one or more of the first through fifth aspects, the feedback comprises a single feedback bit.

In a seventh aspect, alone or in combination with one or more of the first through sixth aspects, the feedback is transmitted via one of a PUCCH or PUSCH message.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
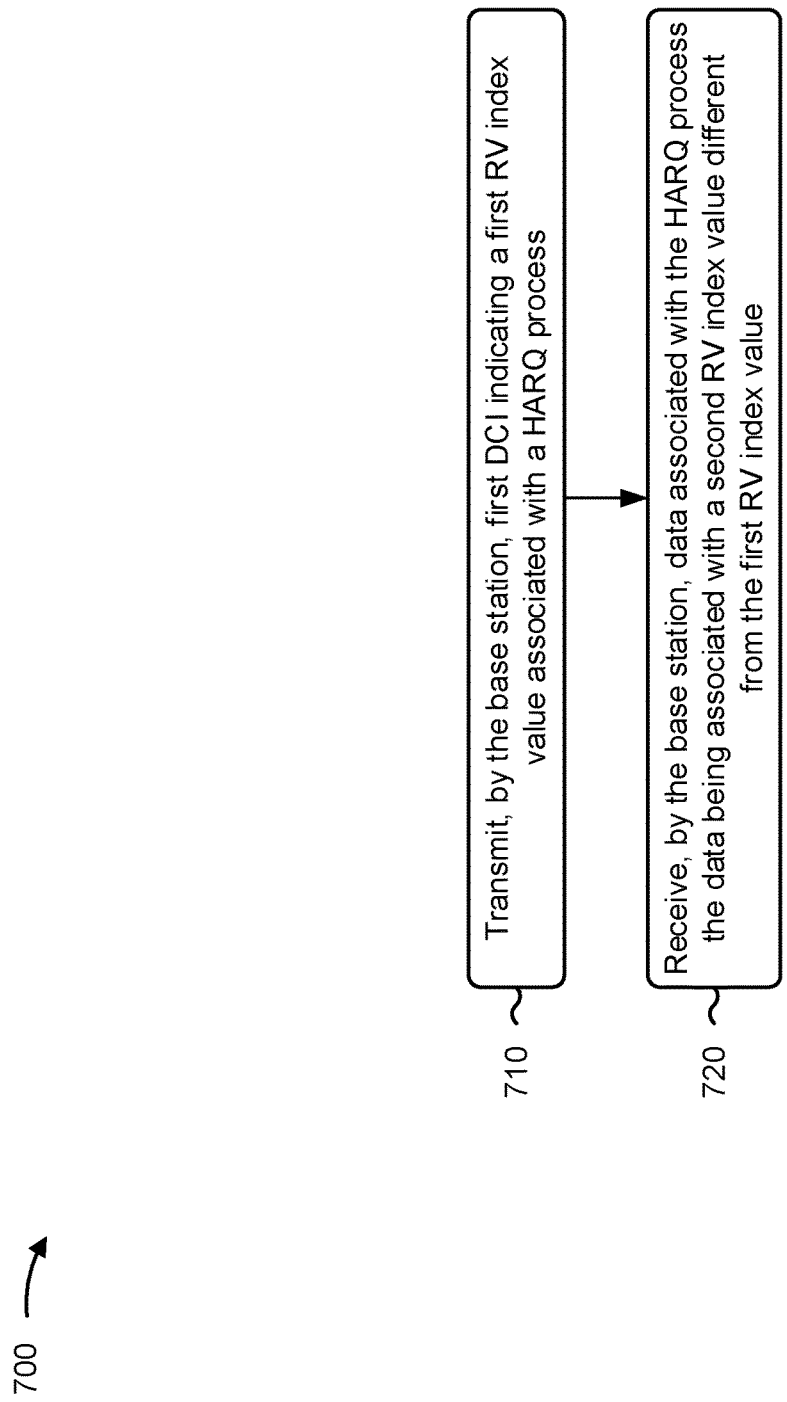

FIG. 7 is a diagram illustrating an example process 700 performed, for example, by a base station, in accordance with the present disclosure. Example process 700 is an example where the base station (e.g., base station 110) performs operations associated with enhancing redundancy version communications.

As shown in FIG. 7, in some aspects, process 700 may include transmitting first DCI indicating a first RV index value associated with a HARQ process (block 710). For example, the base station (e.g., using communication manager 150 and/or transmission component 1004, depicted in FIG. 10) may transmit first DCI indicating a first RV index value associated with a HARQ process, as described above.

As further shown in FIG. 7, in some aspects, process 700 may include receiving data associated with the HARQ process, the data being associated with a second RV index value different from the first RV index value (block 720). For example, the base station (e.g., using communication manager 150 and/or reception component 1002, depicted in FIG. 10) may receive data associated with the HARQ process, the data being associated with a second RV index value different from the first RV index value, as described above.

Process 700 may include additional aspects, such as any single aspect or any combination of aspects described below and/or in connection with one or more other processes described elsewhere herein.

In a first aspect, process 700 includes decoding the data using the second RV index value.

In a second aspect, alone or in combination with the first aspect, process 700 includes determining that the data is to be decoded using the second RV index value based at least in part on failing to decode the data using the first RV index value.

In a third aspect, alone or in combination with one or more of the first and second aspects, process 700 includes receiving feedback indicating that the data is to be decoded using the second RV index value, and determining that the data is to be decoded using the second RV index value based at least in part on the feedback.

In a fourth aspect, alone or in combination with one or more of the first through third aspects, the feedback comprises a 16-bit bitmask that identifies the HARQ process by a bit position of the 16-bit bitmask.

In a fifth aspect, alone or in combination with one or more of the first through fourth aspects, the feedback comprises a 4-bit index that identifies the HARQ process by an identifier.

In a sixth aspect, alone or in combination with one or more of the first through fifth aspects, the feedback comprises a single feedback bit.

In a seventh aspect, alone or in combination with one or more of the first through sixth aspects, the feedback is received via one of a PUCCH or PUSCH message.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
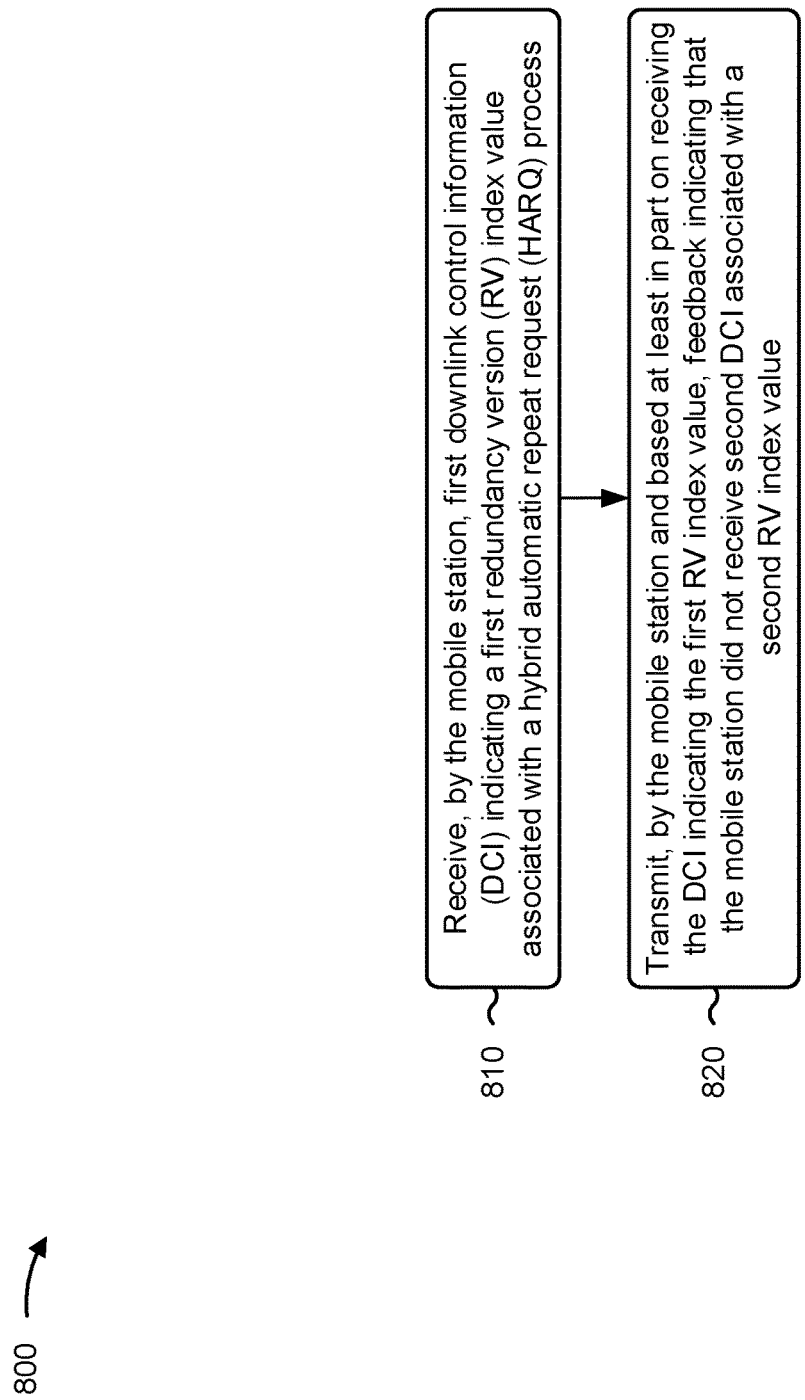

FIG. 8 is a diagram illustrating an example process 800 performed, for example, by a mobile station, in accordance with the present disclosure. Example process 800 is an example where the mobile station (e.g., UE 120) performs operations associated with enhancing redundancy version communications.

As shown in FIG. 8, in some aspects, process 800 may include receiving first DCI indicating a first RV index value associated with a HARQ process (block 810). For example, the mobile station (e.g., using communication manager 140 and/or reception component 902, depicted in FIG. 9) may receive first DCI indicating a first RV index value associated with a HARQ process, as described above.

As further shown in FIG. 8, in some aspects, process 800 may include transmitting, based at least in part on receiving the DCI indicating the first RV index value, feedback indicating that the mobile station did not receive second DCI associated with a second RV index value (block 820). For example, the mobile station (e.g., using communication manager 140 and/or transmission component 904, depicted in FIG. 9) may transmit, based at least in part on receiving the DCI indicating the first RV index value, feedback indicating that the mobile station did not receive second DCI associated with a second RV index value, as described above.

Process 800 may include additional aspects, such as any single aspect or any combination of aspects described below and/or in connection with one or more other processes described elsewhere herein.

In a first aspect, the feedback is transmitted via one of a PUCCH or PUSCH message.

In a second aspect, alone or in combination with the first aspect, the feedback comprises a 16-bit bitmask that identifies the HARQ process by a bit position of the 16-bit bitmask.

In a third aspect, alone or in combination with one or more of the first and second aspects, the feedback comprises a 4-bit index that identifies the HARQ process by an identifier.

In a fourth aspect, alone or in combination with one or more of the first through third aspects, the feedback comprises a single feedback bit.

In a fifth aspect, alone or in combination with one or more of the first through fourth aspects, the feedback comprises two stage feedback, the single feedback bit indicating whether a second stage of feedback is included in the feedback.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
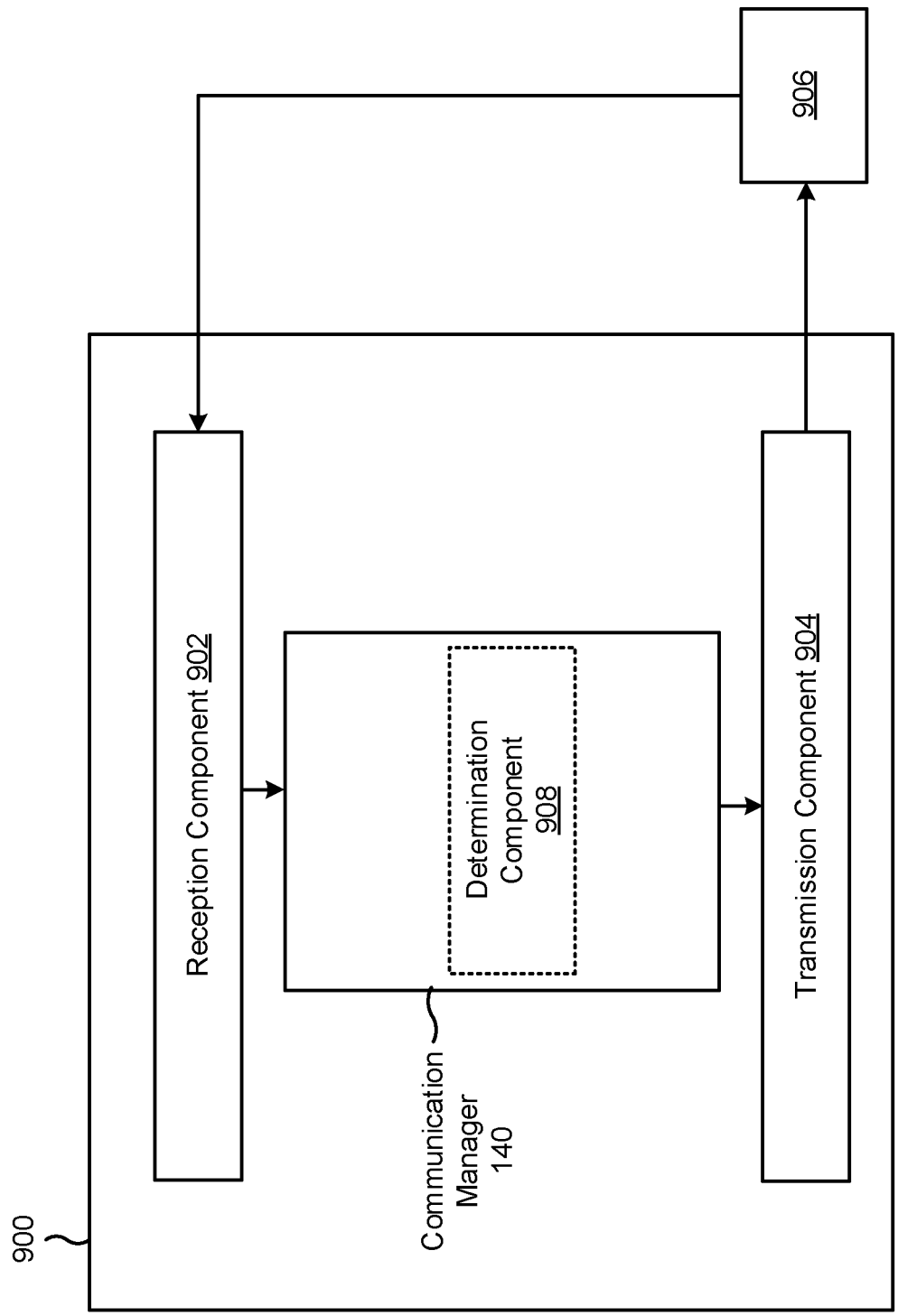
FIGS. 9 and 10 are diagrams of example apparatuses for wireless communication, in accordance with the present disclosure.

FIG. 9 is a diagram of an example apparatus 900 for wireless communication. The apparatus 900 may be a UE (e.g., a mobile station), or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140. The communication manager 140 may include a determination component 908, among other examples.

In some aspects, the apparatus 900 may be configured to perform one or more operations described herein in connection with FIGS. 3-8. Additionally, or alternatively, the apparatus 900 may be configured to perform one or more processes described herein, such as process 600 of FIG. 6, process 800 of FIG. 8, or a combination thereof. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The reception component 902 may receive first DCI indicating a first RV index value associated with a HARQ process. The transmission component 904 may transmit, based at least in part on receiving the DCI indicating the first RV index value, data using a second RV index value, the second RV index value being different from the first RV index value.

The determination component 908 may determine that the first RV index value does not match the second RV index value.

The determination component 908 may determine that the mobile station has not yet transmitted, using the second RV index value, data associated with the HARQ process.

The transmission component 904 may transmit feedback indicating that the mobile station did not receive second DCI associated with the second RV index value.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
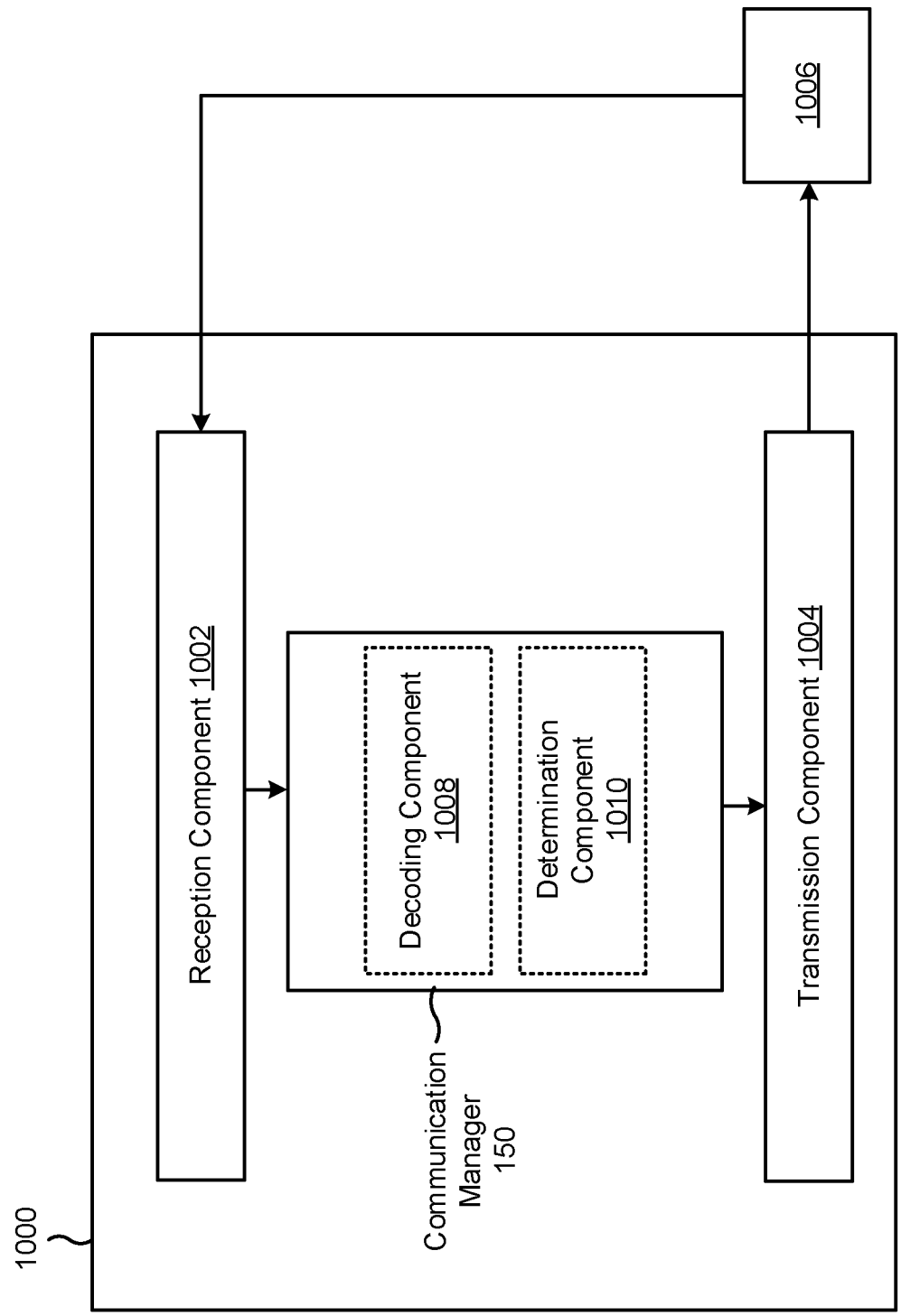

FIG. 10 is a diagram of an example apparatus 1000 for wireless communication. The apparatus 1000 may be a base station, or a base station may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 150. The communication manager 150 may include one or more of a decoding component 1008, or a determination component 1010, among other examples.

In some aspects, the apparatus 1000 may be configured to perform one or more operations described herein in connection with FIGS. 3-8. Additionally, or alternatively, the apparatus 1000 may be configured to perform one or more processes described herein, such as process 700 of FIG. 7. In some aspects, the apparatus 1000 and/or one or more components shown in FIG. 10 may include one or more components of the base station described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the base station described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the base station described in connection with FIG. 2. In some aspects, the transmission component 1004 may be co-located with the reception component 1002 in a transceiver.

The transmission component 1004 may transmit first DCI indicating a first RV index value associated with a HARQ process. The reception component 1002 may receive data associated with the HARQ process, the data being associated with a second RV index value different from the first RV index value.

The decoding component 1008 may decode the data using the second RV index value.

The determination component 1010 may determine that the data is to be decoded using the second RV index value based at least in part on failing to decode the data using the first RV index value.

The reception component 1002 may receive feedback indicating that the data is to be decoded using the second RV index value.

The determination component 1010 may determine that the data is to be decoded using the second RV index value based at least in part on the feedback.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a mobile station, comprising: receiving, by the mobile station, first DCI indicating a first RV index value associated with a HARQ process; and transmitting, by the mobile station and based at least in part on receiving the DCI indicating the first RV index value, data using a second RV index value, the second RV index value being different from the first RV index value.

Aspect 2: The method of Aspect 1, further comprising: determining that the first RV index value does not match the second RV index value; and wherein transmitting the data using the second RV index value comprises: transmitting the data using the second RV index value based at least in part on determining that the first RV index value does not match the second RV index value. wherein transmitting the data using the second RV index value comprises: transmitting the data using the second RV index value based at least in part on determining that the first RV index value does not match the second RV index value.

Aspect 3: The method of any of Aspects 1-2, further comprising: determining that the mobile station has not yet transmitted, using the second RV index value, data associated with the HARQ process; and wherein transmitting the data using the second RV index value comprises: transmitting the data using the second RV index value based at least in part on determining that the mobile station has not yet transmitted, using the second RV index value, the data associated with the HARQ process. wherein transmitting the data using the second RV index value comprises: transmitting the data using the second RV index value based at least in part on determining that the mobile station has not yet transmitted, using the second RV index value, the data associated with the HARQ process.

Aspect 4: The method of any of Aspects 1-3, further comprising: transmitting feedback indicating that the mobile station did not receive second DCI associated with the second RV index value.

Aspect 5: The method of Aspect 4, wherein the feedback comprises a 16-bit bitmask that identifies the HARQ process by a bit position of the 16-bit bitmask.

Aspect 6: The method of Aspect 4, wherein the feedback comprises a 4-bit index that identifies the HARQ process by an identifier.

Aspect 7: The method of Aspect 4, wherein the feedback comprises a single feedback bit.

Aspect 8: The method of Aspect 4, wherein the feedback is transmitted via one of a PUCCH or PUSCH message.

Aspect 9: A method of wireless communication performed by a base station, comprising: transmitting, by the base station, first DCI indicating a first RV index value associated with a HARQ process; and receiving, by the base station, data associated with the HARQ process, the data being associated with a second RV index value different from the first RV index value.

Aspect 10: The method of Aspect 9, further comprising: decoding the data using the second RV index value.

Aspect 11: The method of Aspect 10, further comprising: determining that the data is to be decoded using the second RV index value based at least in part on failing to decode the data using the first RV index value.

Aspect 12: The method of any of Aspects 10-11, further comprising: receiving feedback indicating that the data is to be decoded using the second RV index value; and determining that the data is to be decoded using the second RV index value based at least in part on the feedback.

Aspect 13: The method of Aspect 12, wherein the feedback comprises a 16-bit bitmask that identifies the HARQ process by a bit position of the 16-bit bitmask.

Aspect 14: The method of Aspect 12, wherein the feedback comprises a 4-bit index that identifies the HARQ process by an identifier.

Aspect 15: The method of Aspect 12, wherein the feedback comprises a single feedback bit.

Aspect 16: The method of Aspect 12, wherein the feedback is received via one of a PUCCH or PUSCH message.

Aspect 17: A method of wireless communication performed by a mobile station, comprising: receiving, by the mobile station, first DCI indicating a first RV index value associated with a HARQ process; and transmitting, by the mobile station and based at least in part on receiving the DCI indicating the first RV index value, feedback indicating that the mobile station did not receive second DCI associated with a second RV index value.

Aspect 18: The method of Aspect 17, wherein the feedback is transmitted via one of a PUCCH or PUSCH message.

Aspect 19: The method of any of Aspects 17-18, further comprising: transmitting feedback indicating that the mobile station did not receive second DCI associated with the second RV index value.

Aspect 20: The method of aspect 19, wherein the feedback comprises a 16-bit bitmask that identifies the HARQ process by a bit position of the 16-bit bitmask.

Aspect 21: The method of Aspect 19, wherein the feedback comprises a 4-bit index that identifies the HARQ process by an identifier.

Aspect 22: The method of Aspect 19, wherein the feedback comprises a single feedback bit.

Aspect 23: The method of Aspect 22, wherein the feedback comprises two stage feedback, the single feedback bit indicating whether a second stage of feedback is included in the feedback.

Aspect 24: An apparatus for wireless communication at a device, comprising a processor; memory coupled with the processor; and instructions stored in the memory and executable by the processor to cause the apparatus to perform the method of one or more of Aspects 1-8.

Aspect 25: An apparatus for wireless communication at a device, comprising a processor; memory coupled with the processor; and instructions stored in the memory and executable by the processor to cause the apparatus to perform the method of one or more of Aspects 9-16.

Aspect 26: An apparatus for wireless communication at a device, comprising a processor; memory coupled with the processor; and instructions stored in the memory and executable by the processor to cause the apparatus to perform the method of one or more of Aspects 17-23.

Aspect 27: A device for wireless communication, comprising a memory and one or more processors coupled to the memory, the one or more processors configured to perform the method of one or more of Aspects 1-8.

Aspect 28: A device for wireless communication, comprising a memory and one or more processors coupled to the memory, the one or more processors configured to perform the method of one or more of Aspects 9-16.

Aspect 29: A device for wireless communication, comprising a memory and one or more processors coupled to the memory, the one or more processors configured to perform the method of one or more of Aspects 17-23.

Aspect 30: An apparatus for wireless communication, comprising at least one means for performing the method of one or more of Aspects 1-8.

Aspect 31: An apparatus for wireless communication, comprising at least one means for performing the method of one or more of Aspects 9-16.

Aspect 32: An apparatus for wireless communication, comprising at least one means for performing the method of one or more of Aspects 17-23.

Aspect 33: A non-transitory computer-readable medium storing code for wireless communication, the code comprising instructions executable by a processor to perform the method of one or more of Aspects 1-8.

Aspect 34: A non-transitory computer-readable medium storing code for wireless communication, the code comprising instructions executable by a processor to perform the method of one or more of Aspects 9-16.

Aspect 35: A non-transitory computer-readable medium storing code for wireless communication, the code comprising instructions executable by a processor to perform the method of one or more of Aspects 17-23.

Aspect 36: A non-transitory computer-readable medium storing a set of instructions for wireless communication, the set of instructions comprising one or more instructions that, when executed by one or more processors of a device, cause the device to perform the method of one or more of Aspects 1-8.

Aspect 37: A non-transitory computer-readable medium storing a set of instructions for wireless communication, the set of instructions comprising one or more instructions that, when executed by one or more processors of a device, cause the device to perform the method of one or more of Aspects 9-16.

Aspect 38: A non-transitory computer-readable medium storing a set of instructions for wireless communication, the set of instructions comprising one or more instructions that, when executed by one or more processors of a device, cause the device to perform the method of one or more of Aspects 17-23.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication, comprising:
   a memory; and
   one or more processors coupled to the memory, wherein the one or more processors are configured to:
   receive first downlink control information (DCI) indicating a first redundancy version (RV) index value associated with a hybrid automatic repeat request (HARQ) process;
   determine that data associated with the HARQ process has not yet been transmitted using a second RV index value; and
   transmit, based at least in part on the DCI indicating the first RV index value and the determination that the data associated with the HARQ process has not yet been transmitted using the second RV index value, the data using the second RV index value, wherein the second RV index value is different from the first RV index value.

2. The apparatus of claim 1, wherein the one or more processors are further configured to:
   determine that the first RV index value does not match the second RV index value; and
   wherein the one or more processors, to transmit the data using the second RV index value, are configured to:
   transmit the data using the second RV index value based at least in part on the determination that the first RV index value does not match the second RV index value.

3. An apparatus for wireless communication, comprising:
   a memory; and one or more processors coupled to the memory, wherein the one or more processors are configured to:
receive first downlink control information (DCI) indicating a first redundancy version (RV) index value associated with a hybrid automatic repeat request (HARQ) process;
transmit, based at least in part on the DCI indicating the first RV index value, data using a second RV index value, wherein the second RV index value is different from the first RV index value; and
transmit feedback indicating non-receipt of second DCI associated with the second RV index value.

4. The apparatus of claim 3, wherein the feedback comprises a 16-bit bitmask that identifies the HARQ process by a bit position of the 16-bit bitmask.

5. The apparatus of claim 3, wherein the feedback comprises a 4-bit index that identifies the HARQ process by an identifier.

6. The apparatus of claim 3, wherein the feedback comprises a single feedback bit.

7. The apparatus of claim 3, wherein, to transmit the feedback, the one or more processors are configured to transmit the feedback via one of a physical uplink control channel (PUCCH) message or a physical uplink shared channel (PUSCH) message.

8. A base station for wireless communication, comprising:
a memory; and
one or more processors coupled to the memory, wherein the one or more processors are configured to:
transmit first downlink control information (DCI) indicating a first redundancy version (RV) index value associated with a hybrid automatic repeat request (HARQ) process;
receive data associated with the HARQ process, wherein the data is associated with a second RV index value different from the first RV index value; and
decode, based at least in part on a failure to decode the data using the first RV index value, the data using the second RV index value.

9. A base station for wireless communication, comprising:
a memory; and
one or more processors coupled to the memory, wherein the one or more processors are configured to:
transmit first downlink control information (DCI) indicating a first redundancy version (RV) index value associated with a hybrid automatic repeat request (HARQ) process;
receive data associated with the HARQ process, wherein the data is associated with a second RV index value different from the first RV index value;
receive feedback indicating that the data is to be decoded using the second RV index value; and
decode, based at least in part on the feedback, the data using the second RV index value.

10. The base station of claim 9, wherein the feedback comprises a 16-bit bitmask that identifies the HARQ process by a bit position of the 16-bit bitmask.

11. The base station of claim 9, wherein the feedback comprises a 4-bit index that identifies the HARQ process by an identifier.

12. The base station of claim 9, wherein the feedback comprises a single feedback bit.

13. The base station of claim 9, wherein, to receive the feedback, the one or more processors are configured to receive the feedback via one of a physical uplink control channel (PUCCH) message or a physical uplink shared channel (PUSCH) message.

14. An apparatus for wireless communication, comprising:
a memory; and
one or more processors coupled to the memory, wherein the one or more processors are configured to:
receive first downlink control information (DCI) indicating a first redundancy version (RV) index value associated with a hybrid automatic repeat request (HARQ) process; and
transmit, based at least in part on the DCI indicating the first RV index value, feedback indicating non-receipt of second DCI associated with a second RV index value.

15. The apparatus of claim 14, wherein, to transmit the feedback, the one or more processors are configured to transmit the feedback via one of a physical uplink control channel (PUCCH) message or a physical uplink shared channel (PUSCH) message.

16. The apparatus of claim 14, wherein the feedback comprises a 16-bit bitmask that identifies the HARQ process by a bit position of the 16-bit bitmask.

17. The apparatus of claim 14, wherein the feedback comprises a 4-bit index that identifies the HARQ process by an identifier.

18. The apparatus of claim 14, wherein the feedback comprises a single feedback bit.

19. The apparatus of claim 18, wherein the feedback comprises two stage feedback, the single feedback bit indicating whether a second stage of feedback is included in the feedback.

20. A method of wireless communication performed by an apparatus, comprising:
receiving first downlink control information (DCI) indicating a first redundancy version (RV) index value associated with a hybrid automatic repeat request (HARQ) process;
determining that data associated with the HARQ process has not yet been transmitted using a second RV index value; and
transmitting, based at least in part on the DCI indicating the first RV index value and the determination that the data associated with the HARQ process has not yet been transmitted using the second RV index value, the data using the second RV index value, wherein the second RV index value is different from the first RV index value.

21. The method of claim 20, further comprising:
determining that the first RV index value does not match the second RV index value; and
wherein transmitting the data using the second RV index value comprises:
transmitting the data using the second RV index value based at least in part on the determination that the first RV index value does not match the second RV index value.

22. A method of wireless communication performed by an apparatus, comprising:
receiving first downlink control information (DCI) indicating a first redundancy version (RV) index value associated with a hybrid automatic repeat request (HARQ) process;
transmitting, based at least in part on the DCI indicating the first RV index value, data using a second RV index value, wherein the second RV index value is different from the first RV index value; and transmitting feedback indicating non-receipt of second DCI associated with the second RV index value.

23. The method of claim 22, wherein the feedback comprises a 16-bit bitmask that identifies the HARQ process by a bit position of the 16-bit bitmask.

24. The method of claim 22, wherein the feedback comprises a 4-bit index that identifies the HARQ process by an identifier.

25. The method of claim 22, wherein the feedback comprises a single feedback bit.

26. The method of claim 22, wherein the feedback is transmitted via one of a physical uplink control channel (PUCCH) message or a physical uplink shared channel (PUSCH) message.

* * * * *